(12) United States Patent
Marks et al.

(10) Patent No.: US 7,160,965 B2
(45) Date of Patent: Jan. 9, 2007

(54) CYCLOPENTADIENYL-CONTAINING LOW-VALENT EARLY TRANSITION METAL OLEFIN POLYMERIZATION CATALYSTS

(75) Inventors: Tobin J. Marks, Evanston, IL (US);
Lubin Luo, Baton Rouge, LA (US);
Sung Cheol Yoon, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 11/121,775

(22) Filed: May 4, 2005

(65) Prior Publication Data

US 2005/0209417 A1    Sep. 22, 2005

Related U.S. Application Data

(62) Division of application No. 10/842,725, filed on May 10, 2004, which is a division of application No. 10/325,330, filed on Dec. 19, 2002, now abandoned, which is a division of application No. 09/608,855, filed on Jun. 30, 2000, now Pat. No. 6,670,299.

(60) Provisional application No. 60/142,329, filed on Jul. 3, 1999.

(51) Int. Cl.
*C08F 4/6392* (2006.01)
*C08F 4/64* (2006.01)

(52) U.S. Cl. .................. 526/160; 526/134; 526/329.2; 526/329.7; 526/943

(58) Field of Classification Search ................ 526/131, 526/160, 329.2, 329.7, 943
See application file for complete search history.

(56) References Cited

U.S. PATENT DOCUMENTS 6,544,922 B1 *  4/2003  Marks et al. ................ 502/152

\* cited by examiner

*Primary Examiner*—Caixia Lu
(74) *Attorney, Agent, or Firm*—James R. Henes

(57) ABSTRACT

A catalyst system useful to polymerize and co-polymerize polar and non-polar olefin monomers is formed by in situ reduction with a reducing agent of a catalyst precursor comprising $$\{Cp^*MRR'_n\}^+\{A\}^-$$

wherein $Cp^*$ is a cyclopentadienyl or substituted cyclopentadienyl moiety; M is an early transition metal; R is a $C_1$–$C_{20}$ hydrocarbyl; R' are independently selected from hydride, $C_1$–$C_{20}$ hydrocarbyl, $SiR''_3$, $NR''_2$, $OR''$, $SR''$, $GeR''_3$, $SnR''_3$, and C=C-containing groups ($R''=C_1$–$C_{10}$ hydrocarbyl); n is an integer selected to balance the oxidation state of M; and A is a suitable non-coordinating anionic cocatalyst or precursor. This catalyst system may form stereoregular olefin polymers including syndiotactic polymers of styrene and methylmethacrylate and isotactic copolymers of polar and nonpolar olefin monomers such as methylmethacrylate and styrene.

20 Claims, No Drawings

CYCLOPENTADIENYL-CONTAINING LOW-VALENT EARLY TRANSITION METAL OLEFIN POLYMERIZATION CATALYSTS

CROSS-REFERENCE TO RELATED APPLICATIONS

This application is a division of application Ser. No. 10/842,725, filed May 10, 2004, which is a division of application Ser. No. 10/325,330 filed Dec. 19, 2002 and abandoned on Nov. 17, 2004, which is a division of application Ser. No. 09/608,855 filed Jun. 30, 2000, and issued on Dec. 30, 2003 as U.S. Pat. No. 6,670,299, which claims the benefit of U.S. Provisional Application No. 60/142,329, filed Jul. 3, 1999, which are incorporated by reference herein.

STATEMENT REGARDING FEDERALLY SPONSORED RESEARCH OR DEVELOPMENT

This invention, in part, was made with Government support under Grant No. 86 ER 13511 awarded by the United States Department of Energy. The United States Government may have certain rights in this invention.

BACKGROUND OF THE INVENTION

This invention relates to a cylcopentadienyl-containing low-valent transition metal catalyst that is useful in polymerizing and co-polymerizing polar and non-polar olefin monomers, and more particularly relates to an in situ reduced Group 4 metal polymerization catalyst that is capable of forming polymers and copolymers of conjugated monomers such as methyl methacrylate (MMA) and styrene.

Catalysts based on early transition metal $d^0$ complexes, such as Ziegler-Natta catalysts, are used extensively for coordination polymerization of nonpolar olefins such as ethylene and propylene. However, due to their highly oxophilic nature, these catalysts typically are incompatible with functionalized vinyl monomers in achieving either insertive polymerization of polar olefins or copolymerization of non-polar olefins with polar comonomers.

Late transition metal catalysts are less oxophilic; however, most often they effect olefin dimerization or oligomerization rather than polymerization to high molecular weight polymers. Recently, Brookhart and co-workers (J. Am. Chem. Soc., 1996, 118, 267–268) reported examples of late transition metal-catalyzed insertive copolymerizations of nonpolar olefins (ethylene and propylene) with alkyl acrylates to give high molar mass (high molecular weight) polymers. However, activities become significantly lower as the polar comonomer concentration increases and polar groups are only detected at the end of polymer chain branches. Polymerization of olefins containing functional groups in a position remote from the vinyl group by early transition metal catalysts has been reported as have been very oxophilic catalysts such as lanthanocene and zirconocene to catalyze polymerization of polar monomers such as MMA or lactones through a Michael addition mechanism.

Crystalline vinyl aromatic polymers such as syndiotactic polystyrene have been produced from single-site or metallocene catalysts. EP 0 421 659 describes production of syndiotactic polystyrene using a mono-cyclopentadienyl complexed transition metal catalyst in combination with a non-coordinating anion such as a perfluoro borane or borate.

Polymers of polar vinyl monomers, such as MMA, are well known and typically are produced through a radical polymerization mechanism. Radical polymerization processes may have high polymerization activity for functionalized olefins, but usually require high pressure, produce broad molecular weight distribution resins, and do not control stereoregularity. Single-site catalysts, such as those based on a cylcopentadienyl ligand complexed with a transition metal, polymerize olefins with controllable molecular weights and stereoregularity and with narrow molecular weight distributions. However, these single-site catalysts typically do not polymerize functionalized olefins or copolymerize a functionalized with non-functionalized olefins.

Copolymerization of polar monomers with olefins using transition metal complexes is reviewed by Boffa and Novak, Chem. Rev. 2000, 100, 1479–1493, incorporated by reference herein.

Soga et al., Macromolecules, 1994, 27, 7938–7940, report formation of a syndio-rich atactic polymer of MMA using a metallocene cationic complex $Cp_2Zr(CH_3)^+B(C_6F_5)_4^-$ in toluene in the required presence of diethyl zinc. Also, Chen et al. J. Am. Chem. Soc., 1998, 120, 6287–6305, incorporated herein by reference, reported MMA polymerization using a binuclear $\{Cp_2Zr(CH_3)\}_2CH_3^+$-type catalyst using a living group transfer process mechanism and not coordinative polymerization.

U.S. Pat. No. 5,616,748 describes formation of a neutral reduced metal titanium cyclopentadienyl complex using a lithium alkyl reducing agent, but does not describe combinations with non-coordinating anions or use as a polymerization catalyst for polar and nonpolar olefins.

Our invention relates to a catalyst system that is capable of polymerizing polar and non-polar olefins. Examples of polar/nonpolar copolymers may be stereoregular as well as containing regions of alternating monomer polar/nonpolar units.

In one aspect of this invention, a monocyclopentadienyl transition metal metallocene combined with a non-coordinating cocatalyst anion is reduced in situ with a suitable reducing agent such as zinc metal to form an active olefin polymerization catalyst system capable of polymerizing and copolymerizing both polar and nonpolar olefins.

In another aspect of this invention, a monocylcopentadienyl-containing Group 4 metal complex in combination with a non-coordinating borate anion is reduced in situ with a metallic reducing agent such as zinc to form an active olefin polymerization catalyst.

In another aspect of the invention, stereoregular copolymers of polar and nonpolar olefins are formed. In other aspect of the invention styrene and methylmethacrylate are polymerized to crystalline polymers and copolymerized to isotactic copolymers containing 10 mol % or more of methylmethacrylate monomer units. These and other aspects of this invention are described and claimed herein.

Polar copolymers generally are useful as barrier materials for packaging; have improved adhesion/paintability/wetability characteristics; have functionalization points for grafting, coating, and lamination; may be blend compatibilizers for multilayered structures; may be a replacement for halogen-coating polymers, and have improved processing and mechanical properties.

SUMMARY OF THE INVENTION

A catalyst system useful to polymerize and co-polymerize polar and non-polar olefin monomers is formed by in situ reduction with a reducing agent of a catalyst precursor comprising $$\{Cp^*MRR'_n\}^+\{A\}^-$$

wherein Cp* is a cyclopentadienyl or substituted cyclopentadienyl moiety; M is an early transition metal; R is a $C_1$–$C_{20}$ hydrocarbyl; R' are independently selected from hydride, $C_1$–$C_{20}$ hydrocarbyl, $SiR''_3$, $NR''_2$, $OR''$, $SR''$, $GeR''_3$, $SnR''_3$, and C=C-containing groups ($R''$=$C_1$–$C_{10}$ hydrocarbyl); n is an integer selected to balance the oxidation state of M; and A is a suitable non-coordinating anionic cocatalyst or precursor. This catalyst system may form stereoregular olefin polymers including syndiotactic polymers of styrene and methylmethacrylate and isotactic copolymers of polar and nonpolar olefin monomers such as methylmethacrylate and styrene.

DESCRIPTION OF THE INVENTION

This invention describes early transition metal catalyst systems that are capable of polymerizing and co-polymerizing olefin-containing monomers which may be polar or nonpolar. These catalyst systems combine an ability to polymerize monomers in a stereoregular manner by an apparent insertive polymerization mechanism with a stabilization of the normal oxophilic character of early transition metal catalysts to permit polymerization of polar monomers. Also these catalyst systems may polymerize olefin monomers that are functionalized with polar groups that typically poison conventional early transition metal catalysts.

It is believed that at least for many polymerizations described in this invention, an intermediate is formed containing the transition metal species and an olefin polymer chain into which olefin monomer inserts to extend the polymer chain. This "insertive" polymerization typically forms stereospecific polymers. For example, homopolymerization of a polar monomer such as MMA according to this invention typically will form syndiotactic polymer, and copolymerization of a polar and nonpolar monomers (e.g., MMA and styrene) forms co-isotactic copolymers. As used for this invention, syndiotactic polymer refers to a polyolefin backbone polymer with a majority of substituents in alternating stereopositions. Such syndiotactic stereo microstructure is observed as racemic (r) triads in $^{13}C$ nuclear magnetic resonance (NMR) spectroscopy. In an isotactic (or, for a copolymer, a co-isotactic) polymer, the majority of substituents are located in one stereoposition and this microstructure is observed as meso (m) triads in $^{13}C$ NMR spectroscopy.

The catalyst systems of this invention are based on an in situ reduced low-valent monocyclopentadienyl complex that does not exhibit a sufficient oxophilic character to prevent polar monomer polymerization. Useful catalyst systems include early transition metal materials that have been charge balanced with a suitable anionic co-catalyst and reduced to a lower oxidation state using a suitable reducing agent.

As used in this invention, a transition metal is complexed with a cyclopentadienyl moiety to form a catalyst precursor. Preferably, a neutral transition metal precursor is complexed with a cylcopentadienyl structure represented as:

$$Cp^*MRR'_n$$

wherein Cp* is a cyclopentadienyl or substituted cyclopentadienyl moiety; M is an early transition metal such as a Group 4 transition metal; R is a $C_1$–$C_{20}$ hydrocarbyl substituent suitable for insertive polymerization; R' are independently selected from hydride, $C_1$–$C_{20}$ hydrocarbyl, $SiR''_3$, $NR''_2$, $OR''$, $SR''$, $GeR''_3$, and $SnR''_3$, and C=C-containing groups with $R''$=$C_1$–$C_{10}$ hydrocarbyl; and n is an integer selected to balance the oxidation state of M.

In this invention, hydrocarbyl groups include alkyl, aryl, alkylaryl, arylalkyl, and alkenyl (such as vinylic) groups, and further may be cyclic or acyclic.

Early transition metals include Groups 3, 4, 5, and 6 (new IUPAC nomenclature) and lanthanide metals and particularly include Group 4 metal species (e.g., titanium, zirconium, and hafnium) with titanium in the +4 formal oxidation state ($Ti^{IV}$) as the preferred transition metal useful in this invention.

For the preferable Group 4 transition metal, such as titanium, in the +4 formal oxidation state, a neutral transition metal precursor is complexed with a cylcopentadienyl structure represented as:

$$Cp^*MRR'_2$$

wherein Cp, R, R' are as defined above.

To form the catalyst system of this invention, a precursor is formed by reaction with a non-coordinating co-catalyst (A) to form a Cp*M cation charge balanced with the co-catalyst anion to form a catalyst precursor structure represented as:

$$\{Cp^*MRR'_n\}^+\{A\}^-$$

wherein Cp* is a cyclopentadienyl or substituted cyclopentadienyl moiety; M is an early transition metal; R is a $C_1$–$C_{20}$ hydrocarbyl; R' are independently selected from hydride, $C_1$–$C_{20}$ hydrocarbyl, $SiR''_3$, $NR''_2$, $OR''$, $SR''$, $GeR''_3$, $SnR''_3$ and C=C-containing groups ($R''$=$C_1$–$C_{10}$ hydrocarbyl); n is an integer selected to balance the oxidation state of M; and A is a suitable non-coordinating anionic cocatalyst.

Typically, a Group 4 transition metal Cp*M complex is reacted with a non-coordinating co-catalyst (A) to form a Cp*M cation charge balanced with the co-catalyst anion to form a catalyst precursor structure represented as:

$$\{Cp^*M^{IV}RR'\}^+\{A\}^-$$

To produce the catalyst systems useful in this invention, the Cp-containing catalyst precursor is reduced with a reducing agent in situ to form what is believed to be a Cp*M complex containing a transition metal that has been reduced from its highest oxidation state to form a complex capable of polymerizing olefins.

A preferable catalyst precursor includes $Ti^{IV}$ with R and R' selected as methyl, as represented below:

$$\{Cp^*Ti^{IV}Me_2\}^+\{A\}^-$$

If the transition metal is titanium, the substituent R is methyl, and the reducing agent is zinc metal, resulting complex (assumed to be $Cp^*Ti^{III}$) may be formed according to the following proposed reaction scheme:

$$\{Cp^*Ti^{IV}Me_2\}^+\{A\}^- \xrightarrow{Zn} \{Cp^*Ti^{III}Me\}^+\{A\}^-$$

In more detail, early transition metals useful in this invention preferably are Group 4 metals and most preferably titanium. As used in this invention, Cp* is a cyclopentadienyl or substituted cyclopentadienyl group capable of forming a complex with an early transition metal. There may be up to five independently selected substituents per cyclopentadienyl moiety. Substituents onto the cyclopentadienyl may include $C_1$–$C_{20}$ alkyl or aryl groups, which may be acyclic or cyclic, together with compatible heteroatom-containing groups such as groups containing silicon, nitrogen, and phosphorus. Substituents may be alkyl such as methyl, ethyl, propyl, isopropyl, butyl and the like; or aryl such as phenyl or a phenyl substituted with one or more alkyl or aryl groups; or an alkyl substituted with aryl groups. Substituted cyclopentadienyl groups may form cyclic structures such as indenyl or fluorenyl which also may be substituted with similar compatible groups. A preferable Cp* is cyclopentadienyl.

Substituents (R and R') on the Cp*M complex preferably are $C_1$–$C_{20}$ hydrocarbons and most preferably $C_1$–$C_4$ hydrocarbyl. Since the most preferred substituent in the final catalyst system material is methyl, preferably at least one substituent in the precursor complexes is methyl or a substituent which may be replaced by methyl during the catalyst formation process. For example, if the initial substituent on the transition metal is a halide such as chloride, reaction with a MAO or MMAO cocatalyst typically exchanges the halide to methyl as part of the activation process.

Co-catalysts useful in this invention typically are selected from non-coordinating anions or precursors thereof. A non-coordinating anion will balance the charge of a transition metal-containing cation, but will not react with the cation to form a separate neutral species. Thus, the non-coordinating anion will be displaced during polymer formation.

Typically suitable co-catalysts include boron-containing materials such as borates and boranes, and particularly include perfluoro substituted borates and boranes. Other suitable co-catalysts may be formed from aluminate species. Perflluoroarylboranes, such as tris(pentafluorophenyl)borane, $B(C_6F_5)_3$ (FAB), tris (2,2',2"-nonafluorbiphenyl)borane (PBB), tris(β-perfluoronaphthyl)borane (PNB) are preferable co-catalyst anion precursors. The most preferable perfluoroarylboranes cocatalyst precursor is PBB. Although usually not preferred in this for the catalyst systems of this invention, use of methylaluminoxane (MAO) or modified methylaluminoxane (MMAO) as a co-catalyst typically converts a halide substituent in a Cp* complex to the preferred methyl group substituent. Borate salts also may be used as cocatalysts such as trityl ($Ph_3C+$) salts of perfluorophenyl borates. A variety of suitable cocatalysts are described by Chen and Marks, *Chem. Rev.* 2000, 100, 1391–1434, incorporated by reference herein.

Oxygen or water scavengers including aluminum alkyls such as triisobutylaluminum may be used in combination with the catalyst systems of this invention.

Although $Cp*Ti^{III}$ is believed to be formed in the catalyst systems of this invention, it was found that the $Ti^{III}$ compounds, $CP*Ti^{III}Me_2$ and $CpTi^{III}(CH_2Ph)_2$, are unstable in solution at room temperature without the presence of a co-catalyst during reduction. As soon as a cocatalyst such as MAO, $B(C_6F_5)_3$, PBB, or $Ph_3C^+B(C_6F_5)_4^-$ is added to a preformed $Ti^{III}$ compound, decomposition occurs immediately even in the presence of Zn, and the solution obtained displays no catalytic activity for MMA or styrene polymerization. Thus, in a preferred method to produce the catalyst system of this invention, a neutral transition metal metallocene precursor, such as $Cp*TiMe_3$ is reacted with a cocatalyst, such as trityl perfluorophenyl borate ($Ph_3C^+B(C_6F_5)_4^-$), either prior to, or simultaneously with, contact with a reducing agent such as zinc metal. Either procedure is considered to be an in situ reduction of a metallocene/anionic co-catalyst precursor according to this invention. Typically, the reaction of the metallocene precursor with the co-catalyst occurs in a suitable solvent or diluent that, preferably, is inert to the reactants. A suitable liquid diluent is toluene, although other hydrocarbons or substituted hydrocarbons may be used.

The in situ reduction of the metallocene/anionic co-catalyst precursor typically is performed at ambient temperatures, but may be conducted at any temperature at which the reduction occurs at a reasonable rate and at which the reactants and products are stable. Typical reduction temperatures are from about 0 to 50° C. and normally are about 15 to 30° C. Reaction times may range from a few minutes to a few hours and typically are from about 30 minutes to about three hours. The in situ reduction may occur in an diluent or solvent such as toluene or other liquid hydrocarbon or substituted hydrocarbon.

Suitable reducing agents typically are metals or metal alloys that are capable of reducing a transition metal to a lower oxidation state and particularly of reducing a Group 4 transition metal in a +4 oxidation state to a lower (e.g., +3) oxidation state. The preferable metallic reducing agent useful in this invention is zinc metal which typically is in the form of a fine powder. Other reducing agents include Zn—Cu, Zn—Ag, Mg, Ca, Na, Sn, Na/Hg, K/Hg, and Mg/Hg. Other materials considered in this invention to be suitable reducing agents of this invention are alkali or alkaline earth metal aromatic salts such as $Na^+Ar^-$ and $Mg^{+2}Ar^{-2}$, where Ar is an aromatic moiety.

Although the reducing agent, such as zinc is necessary to stabilize the catalyst system during reduction, it has been observed that presence of the reducing agent is not necessary during polymerization.

In catalyst systems of this invention, the $\{Cp*Ti^{III}Me\}^+$ moiety formed is very open sterically and thus favors binding of functionalized olefins to the metal center through what is believed to be $\eta^4$ coordination (avoiding catalyst poisoning as shown in Eq. 1),

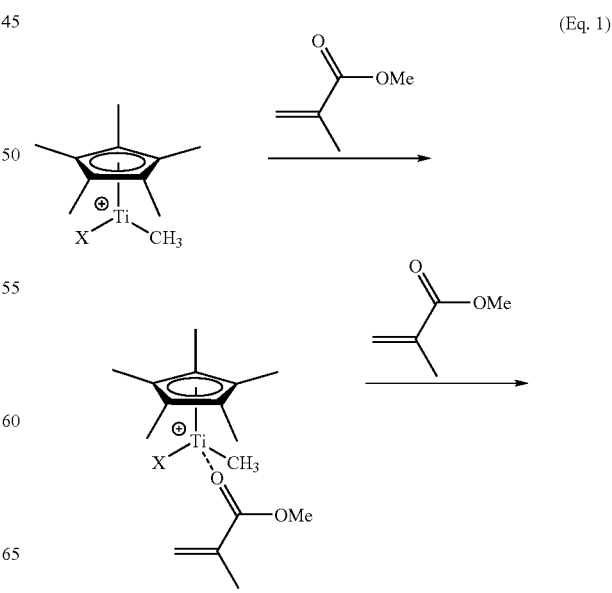

(Eq. 1)

-continued

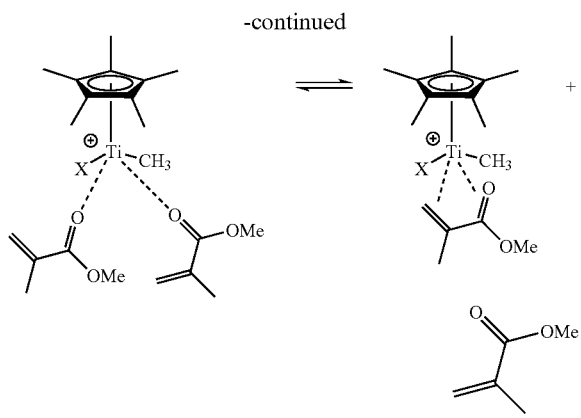

whereas more crowded {Cp'Ti(X)Me}$^+$ type (e.g., X=Cp', {Cp'$_2$TiMe}$^+$; X=Me, {Cp'TiMe$_2$}$^+$; or X=N($^t$Bu), {CGC-TiMe}$^+$) structures are not as suitable for multiple $\eta^4$ MMA binding.

The Ti$^{III}$ compound, Cp*Ti$^{III}$Cl$_2$, activated with MAO in the presence of Zn is active for MMA polymerization but produces an amorphous poly(methylmethacrylate) (a-PMMA). Polymerization of MMA or copolymerization of styrene with MMA catalyzed by this catalyst is much slower than by the Cp*TiMe$_3$/Ph$_3$C$^+$B(C$_6$F$_5$)$_4^-$/Zn system of this invention and does not produce isotactic (co-iso) copolymer product.

The catalysts of this invention may produce both homopolymers and copolymers of polar and nonpolar monomers. According to this invention, copolymers are polymers containing more than one monomer and include terpolymers. A particularly useful copolymer of this invention contains a nonpolar monomer such as styrene and a polar monomer such as MMA.

Monomers useful to form the polymers and copolymers of this invention include both polar and nonpolar olefin species containing from 2 to about 20 carbon atoms. Typically, polar monomers contain other atoms such as oxygen, nitrogen, sulfur, and halides in addition to an olefinic carbon-carbon double bond. The most typical polar monomers contain oxygen or nitrogen such as unsaturated acids including acrylic acid, methacrylic acid, and their derivatives such as acrylates (e.g., methylmethacrylate (MMA) methyl acrylate, butyl acrylate, and butyl methacrylate); vinyl esters (e.g., vinyl acetate, methyl 3-butenonate, methyl 4-pentenoate); unsaturated anhydrides (e.g., maleic anhydride; succinic anhydride); vinyl chloride; vinyl amides; vinyl amines; acrylonitrile; polar group functionalized norbornenes, and the like. Other examples of polar monomers include α,β-unsaturated carbonyl compounds such as carboxylic acids, anhydrides and esters, amides and ketones. A preferable polar monomer used in this invention is MMA.

Suitable nonpolar olefins include ethylene and alpha-olefins (e.g., propylene, 1-butene, 1-pentene, 1-hexene, 4-methylpentene-1,1-heptene, 1-octene, 1-nonene, 1-decene, and the like); internal olefins (e.g., 2-butene); and cyclic olefins (e.g., cyclopentene, cyclohexene, norbornene, and the like); together with dienes (e.g., butadiene, isoprene, 1,5-hexadiene, and the like). Preferable non-polar olefins include C$_4$–C$_{20}$ conjugated dienes such as butadiene and isoprene; aromatic vinyl species such as styrene and divinyl benzene; norbornene; together with alkyl and aryl substituted derivatives thereof. A preferable nonpolar monomer used in this invention is a vinyl aromatic and preferably is styrene.

Catalyst preparation according to this invention should be under oxygen-free and water-free conditions as known in the art. Also, transfer of catalyst to a polymerization reactor should be carried out in an oxygen-free and water-free environment. Monomers used in polymerization should be purified to the extent necessary to remove detrimental contaminants known to the art such as oxygen, water, sulfides, and the like.

The catalysts of this invention may be used directly in solution or slurry polymerization systems. If desired, the catalysts may be supported onto inert materials such as silica, alumina, or silica/alumina as known in the art. Supported catalyst systems are preferable in bulk and gas-phase polymerization techniques.

Typically, sufficient amounts of catalyst or catalyst component are used for the reactor system and process conditions selected. In a polymerization according to this invention, a measured quantity of catalyst material in a solvent or suspension is introduced in a controlled manner to a polymerization vessel. The amount of catalyst will depend upon the activity of the specific catalyst chosen.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to cause catalyst deactivation or polymer degradation. Generally, temperatures range from about 0° to about 120° C. with a range of from about 20° C. to about 95° C. being preferred from the standpoint of attaining good catalyst performance and high production rates. A preferable polymerization range according to this invention is about 50° C. to about 80° C.

Olefin polymerization or copolymerization according to this invention is carried out at monomer pressures of about atmospheric or above. Generally, monomer pressures range from about 20 to about 600 psi (140 to 4100 kPa), although in vapor phase polymerizations or copolymerizations, monomer pressures should not be below the vapor pressure at the polymerization or copolymerization temperature of the alpha-olefin to be polymerized or copolymerized.

The polymerization or copolymerization time will generally range from about ½ to several hours in batch processes with corresponding average residence times in continuous processes. Polymerization or copolymerization times ranging from about 1 to about 4 hours are typical in autoclave-type reactions. In slurry processes, the polymerization or copolymerization time can be regulated as desired. Polymerization or copolymerization times ranging from about ½ to several hours are generally sufficient in continuous slurry processes.

Monomer structures also are important for polymerization and copolymerization. Except for MMA and styrene, other monomers with conjugation such as butadiene and isoprene also are active, whereas monomers without conjugation susceptible to classical cationic polymerization processes such as vinyl ether and vinyl acetate typically are not active. This observation indicates that the polymerization does not proceed by a classical cationic pathway. GPC-derived weight average molecular weight ($M_w$) and molecular weight distribution ($M_w/M_n$) data for PMMA, PS, and copolymers obtained using the present catalysts also indicate typical single site Ziegler-Natta catalyzed copolymer products. Based on these observations and the $^1$H NMR end-group analysis for both homopolymer and copolymer products, a 2,1-insertion mechanistic polymerization scheme can be proposed for the present systems (Eqs. 2-1 and 2-2, below). It is believed that syndio- or co-iso-regulation comes from the prohibited insertion of head-to-tail monomer binding. Detection of minimal or no 1,2-insertion product (polymer chains with terminal end groups) is a evidence of $\eta^4$ monomer binding because such a 1,2-insertion is blocked by the second coordinated double bond, such as C=O for MMA or $\eta^2$ Ph for styrene.

(Eq. 2-1)

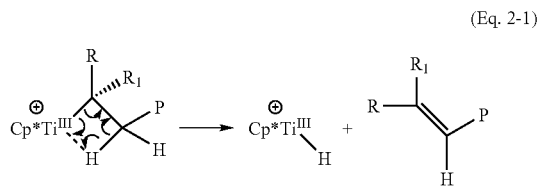

Via 2,1-insertion pathway Chain end with an internal vinyl group (Eq. 2-2)

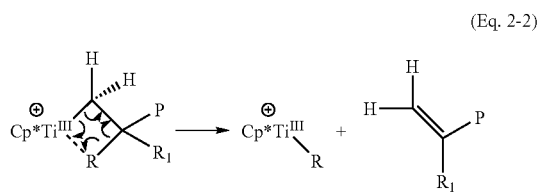

Via 1,2-insertion pathway Chain end with a terminal vinyl group
(P=polymer chain; For styrene: R=H, R1=phenyl; For MMA: R=Me, R1=COOMe)

NMR analysis of the polymer chain end groups (400 MHz, 21° C., in toluene-$d_8$) shows a chemical shift ($\delta$) of 6.03 for syndiotactic polystyrene (s-PS) and $\delta$ 6.35 for syndiotactic poly-MMA (s-PMMA) corresponding to the internal vinyl end group proton chemical shifts. No terminal vinyl end groups (~$\delta$4.8) are detected for either indicating less than 1 mol % present. This indicates that both s-PMMA and s-PS are produced via 2,1-insertion (Eq. 2), not via 1,2-insertion (Eq. 3). The MMA homopolymer with internal vinyl end groups is reported here for the first time.

MMA polymerization rates are slightly higher than those of styrene as observed in Examples 1 and 2. With a 1:1 MMA:styrene feed ratio, large amounts of s-PMMA are obtained instead of copolymer (Example 3) which is consistent with a faster rate of MMA polymerization. This results in the decrease of MMA concentration with increasing reaction times. Thus, in a typical polymerization, copolymers of differing incorporated MMA to styrene ratios are produced. High MMA incorporated copolymer can be obtained by limited conversion procedures, and the MMA percentage incorporation can be controlled by the ratio of the feed MMA and styrene. Limited conversion experiments should be able to control the copolymerization to produce higher MMA incorporated copolymers. Small amounts of amorphous polystyrene (a-PS) usually are obtained, presumably from the product catalyzed by the incomplete reduced $Ti^{IV}$ residue or $\{Cp^*Ti^{III}(MMA)Me\}^+$ complexes. This is confirmed by the observation that the non-aged or non-Zn reduced $Cp^*TiMe_3/Ph_3C^+B(C_6F_5)_4^-$-mediated styrene polymerization at room temperature produces large amounts of a-PS. The reason for the atactic product may be that, compared with the very open $\{Cp^*TiMe\}^+$ structure, the $\{Cp^*Ti(X)Me\}^+$ type complexes (X=Me, $\{Cp^*Ti^{IV}Me_2\}^+$ or X=MMA, $\{Cp^*Ti^{III}(\eta^2\text{-MMA})Me\}^+$) is structurally too congested to adopt multiple styrene $\eta^4$ coordination.

$CP^*Ti^{IV}Me_3$ activated by a suitable cocatalyst has been extensively studied for styrene polymerization and is thought to be reduced to a $Ti^{III}$ species during aging. Without any reductant in the system but with sufficient aging time, the $Ti^{IV}$ species slowly undergo reduction to $Ti^{III}$, indicated by a color change from red to dark brown or dark green and broadening of the Cp* ligand proton signals in the NMR spectra. $Ti^{III}$ ($d^1$) species also are detected by ESR analysis. The species, $\{Cp^*Ti^{III}(PMe_3)_2Me\}^+$, isolated from the addition of excess $PMe_3$ to the aged solution of $Cp^*TiMe_3/B(C_6F_5)_3$ also has been observed. In the present experiments, the aging reduction of $Ti^{IV}$ to $Ti^{III}$ affords only low activity species for MMA polymerization (Comparison Run A). However, metallic Zn was found to accelerate such a reduction and, presumably, also to stabilize the low-valent species. The more complicated $^1$H NMR spectrum of an aged catalyst solution compared to that of a Zn-treated catalyst solution may be due to more rapid decomposition of the catalyst in the absence of Zn. The catalyst after Zn treatment is more active for styrene and MMA homopolymerizations as well as styrene/MMA copolymerization. Once a polymerization is initiated, neither the rate nor polymer properties are sensitive to the presence or absence or residual metallic Zn.

Either the PMMA or PS produced from homopolymerization is syndiotactic (Table 1, Ex. 1 and 2). Unlike radical, anionic, or cationic copolymerizations that produce non-steroregulated random copolymers, i.e., copolymers consisting of all three possible styrene-MMA-styrene (or MMA-styrene-MMA) triad microstructures (co-sydio; co-hetero; and co-iso), the $\{Cp^*Ti^{III}Me\}^+$ mediated copolymerization of styrene with MMA using the catalyst systems of this invention typically produces mainly a co-iso random copolymer product, while a co-hetero structure hardly is detected. The MMA incorporation ratio is indicated by the PS ortho-phenyl proton low field shift ratio (~$\delta$ 6.5 ppm for homo PS and ~$\delta$ 7.2 ppm for styrene/MMA copolymer) due to the interaction of PS ortho-phenyl protons and PMMA ester groups.

Copolymers of vinyl aromatic monomers such as styrene and acrylate monomers such as methyl methacrylate may be formed using the catalysts of this invention under typical polymerization conditions. These polymeric materials include isotactic copolymers of styrene and MMA with MMA incorporation ranging from up to 2 to up to 30 mol percent or more. More particularly, these isotactic copolymers comprise from about 2 to about 15 mol % of MMA and may contain about 4 to about 12 mol % MMA. A typical isotactic copolymer of styrene and MMA of this invention contains about 10 mol % of MMA. Observation of an isotactic microstructure of these copolymers indicates substantial regions of alternating styrene/MMA copolymer. Quantities of amorphous polystyrene also may be combined with the styrene/MMA copolymer product of this invention.

Typical molecular weights of polymers of this invention may range from about 1000 to about 100,000 or above, and preferably are from about 30,000 to about 90,000

Fractions of polymer formed using the catalysts and techniques described in this invention, may be separated by dissolving the total amount of polymer in a suitable solvent such as toluene and then selectively precipitating fractions of polymer containing decreasing portions of polar monomer with a suitable antisolvent such as methanol.

This invention is illustrated, but not limited, by the following examples and comparative runs:

The catalyst precursors Cp*TiMe$_3$, Cp*TiMe$_2$, and Cp*TiCl$_2$, as well as cocatalysts B(C$_6$F$_5$)$_3$ and PBB were synthesized according to literature procedures. The starting materials Cp*TiCl$_3$, cocatalyst MAO, zinc, MMA monomer and styrene monomer were obtained from Aldrich. The cocatalyst (C$_6$H$_5$)$_3$C$^+$B(C$_6$F$_5$)$_4^-$ was obtained from Asahi Glass Co. MMA and styrene were purified by distillation from calcium hydride and stored at −30° C. over molecular sieves. Before polymerization experiments, AlEt$_3$ (Aldrich product) was added to the monomer or monomer mixture to make an 1×10$^{-3}$ M solution and aged for 10 min prior to vacuum transfer to the reactor to destroy protonic sources. Zn dust was washed with 10% HCl aqueous solution, then with distilled water and acetone, and dried under vacuum overnight before transfer to a glovebox for storage. Solvents such as toluene or pentane were predried by storage over sodium wire then distilled from and stored over Na/K alloy. Solid MAO was obtained by vacuum removal of solvent from the commercial 1.6 M hexane solution and dried under high vacuum (10$^{-6}$ torr) overnight to remove AlR$_3$. (C$_6$H$_5$)$_3$C$^+$B(C$_6$F$_5$)$_4^-$ was purified by recrystallization from toluene/pentane.

EXAMPLE 1

Polymerization of Styrene Catalyzed by an In Situ Generated Ti(III) Catalyst

A portion of dry styrene (2.0 milliliters (mL), 19 mmol) was vacuum transferred into a 50 mL flame-dried oxygen-free, moisture-free flask having a side outlet fitted with a rubber septum and equipped with a magnetic stirrer and was placed in a 21° C. water bath. A 2 mL Wilmad screw-capped vial and an air-tight syringe were brought into a glovebox and 7.0 mg (31 μmol) of Cp*TiMe$_3$, 28.0 mg (31.0 μmol) of (C$_6$H$_5$)$_3$C$^+$B(C$_6$F$_5$)$_4^-$, and about 1 mL of toluene was charged into the vial, followed by vigorous shaking for 2 minutes to allow the reagents to react. Then 15 mg (225 μmol) of Zn powder was added to the solution and the mixture allowed to stand for 75 min. The solution color changed from orange to dark brownish-green. The solution was removed from the glovebox and the supernatant injected into the stirring styrene solution by syringe. After vigorously stirring for 15 min, the reaction was quenched by addition of 20 mL of methanol (MeOH). The resulting polymer was collected by filtration and then redissolved in 20 mL of C$_2$H$_2$Cl$_4$ at 90° C. After addition of 100 mL MeOH to precipitate the polymer, the suspension was filtered to remove any catalyst residue. The colorless polymeric material was then triturated with 100 mL of MeOH by vigorously stirring for 24 h. The solid polymer was then collected by filtration, washed three times with 10 mL portions of MeOH, and dried at 120° C. under vacuum for 24 hours. The yield was 1.2 grams. Results are shown in Table 1.

EXAMPLE 2

Polymerization of MMA Catalyzed by an In Situ Generated Ti(III) Catalyst

A portion of dry methylmethacrylate (MMA) (2.0 milliliters (mL), 19 mmol) was vacuum transferred to a 50 mL flame-dried oxygen-free, moisture-free flask having a side outlet fitted with a rubber septum and equipped with a magnetic stirrer and was placed in a 21° C. water bath. A 2 mL Wilmad screw-capped vial and an air-tight syringe were brought into a glovebox and 7.0 mg (31 μmol) of Cp*TiMe$_3$, 26.0 mg (29.0 μmol) of (C$_6$F$_5$)$_3$C+B(C$_6$F$_5$)$_4^-$, and about 1 mL of toluene was charged into the vial, followed by vigorous shaking for 2 min to allow the reagents to react. Slightly less (C$_6$H$_5$)$_3$C$^+$ B(C$_6$F$_5$)$_4^-$ than Cp*TiMe$_3$ in molar ratio was used to ensure complete reaction of (C$_6$H$_5$)$_3$C+B(C$_6$F$_5$)$_4^-$ and to eliminate possible cationic polymerization initiated by (C$_6$H$_5$)$_3$C$^+$. Then, 15 mg (225 μmol) of Zn powder was added to the solution and the mixture allowed to stand for 80 min. The solution color changed from orange to dark brownish-green. The solution was removed from the glovebox and the supernatant injected into the stirring MMA solution by syringe. After vigorously stirring for 5 min, the reaction was quenched by addition of 20 mL of MeOH. The resulting polymer was collected by filtration and then redissolved in 20 mL CHCl$_3$. After addition of 100 mL MeOH to precipitate the polymer, the suspension was filtered to remove any catalyst residue. The colorless polymeric material was then triturated with 100 mL of MeOH by vigorously stirring for 24 hours. The solid polymer was collected by filtration, washed three times with 10 mL portions of MeOH, and dried at 120° C. under vacuum for 24 h. The yield was 1.4 g. Results are shown in Table 1.

Comparative Run A

Copolymerization of Styrene with MMA Catalyzed by an In Situ Generated Ti(III) Species without Zn Assisted Reduction In a glovebox, a 50 mL flame-dried oxygen-free, moisture-free flask having a side outlet fitted with a rubber septum and equipped with a magnetic stirrer was charged with 10.3 mg (45.1 μmol) of Cp*TiMe$_3$, 40.1 mg (43.5 μmol) of (C$_6$H$_5$)$_3$C$^+$ B(C$_6$F$_5$)$_4^-$, and 2 mL of dry toluene. The flask was placed in a 65° C. water bath for *min*. The solution color changed from orange to *brown*. *Then* the flask was placed in another 2° C. water bath for 15 min to reach thermal equilibrium. Next, 10 mL (94 mmol) dry 1:1 molar MMA/styrene mixture were injected into the stirring catalyst solution by syringe. After 24 hours, the reaction was quenched by addition of 20 mL MeOH and volatiles removed under vacuum. The solid polymeric material was redissolved in 5 mL CHCl$_3$ and 50 mL of MeOH was added to precipitate the polymer. Colorless polymer was obtained by filtration, triturated with 10 mL MeOH by vigorously stirring for 24 h. The solid polymer is then collected by filtration, washed with 3×5 mL of MeOH, and dried at 120° C. under vacuum for 24 h. The yield was 0.8 g. Results are shown in Table 1.

EXAMPLE 3

Copolymerization of Styrene with MMA Catalyzed by In Situ Generation of Ti(III) Species with Zn Assisted Reduction In a glovebox, a 50 mL flame-dried oxygen-free, moisture-free flask having a side outlet fitted with a rubber septum and equipped with a magnetic stirrer was charged with 7.7 mg (34 μmol) of Cp*TiMe$_3$, 26.8 mg (29 μmol) of (C$_6$H$_5$)$_3$C$^+$B(C$_6$F$_5$)$_4^-$, and 1 mL of dry toluene. After 2 min with occasionally shaking, 15 mg Zn powder was added to the flask. The flask was placed in a 55° C. water bath and stirred for 25 min. The solution color changed from orange to brownish-green. Then the flask was placed in another 21° C. water bath for 15 min to reach thermal equilibrium. A portion (10 mL, 94 mmol) of dry 1:1 molar MMA/styrene mixture was injected into the stirring catalyst solution by syringe. After 180 min, the reaction was quenched by addition of 20 mL MeOH and volatiles removed under vacuum. The solid polymeric material (6 g) was extracted with a 1:3 toluene/MeOH mixture. This was carried out by dissolving the polymer in 100 mL toluene and then adding 300 mL MeOH. Copolymer with a higher proportion of incorporated MMA is more soluble in toluene/MeOH mixture. The filtrate from the first extraction thus contained 0.3 g of copolymer with about 36% MMA incorporation. The MMA incorporation ratio decreased with increasing numbers of extractions. The extraction was repeated three times, and the final product was found to be a copolymer with about 15% MMA incorporation. The colorless polymeric material after extraction was obtained by removal of solvent and then triturating with 100 mL MeOH by vigorously stirring for 24 hours. The solid polymer was collected by filtration, washed with 3×10 mL of MeOH, and dried at 120° C. under vacuum for 24 h. The yield was 5.0 g. Results are shown in Table 1.

EXAMPLE 4

Copolymerization of Styrene with MMA Catalyzed by In Situ Generation of Ti(III) Species with Zn Assisted Reduction Dry 20:1 styrene/MMA mixture (10 mL, 94 mmol) was vacuum transferred into a 50 mL flame-dried, oxygen/moisture-free flask having a side outlet fitted with a rubber septum and equipped with a magnetic stirrer. The flask was placed in a 21° C. water bath. A 2 mL Wilmad screw-capped vial and an air-tight syringe were brought into the glovebox. Next, 8.0 mg (34 µmol) of Cp*TiMe$_3$, 30.0 mg (32.5 µmol) of $(C_6H_5)_3C^+B(C_6F_5)_4^-$, and about 1 mL of toluene were charged in the vial, followed by vigorous shaking for 2 min to allow the reagents to react. Then 25 mg (380 µmol) of Zn powder were added to the solution and the mixture aged for 1.5 hours. Over this time period, the solution color changed from orange to dark brownish-green. The solution was removed from the glovebox and the supernatant injected into the stirring MMA/styrene mixture by syringe. After vigorous stirring for 60 min, the reaction was quenched by addition of 20 mL of MeOH. After filtration, the polymer was extracted with a 1:3 toluene/MeOH mixture, which was carried out by dissolving the polymer in 100 mL toluene and then adding 300 mL MeOH. The filtrate from the first extraction contained 2 g (not dry) copolymer with about 40% MMA incorporation. The MMA incorporation ratio decreased with increasing numbers of extractions. The extraction was repeated three times, and the final product was found to be a mixture of amorphous polystyrene (a-PS) and copolymer with about 10% MMA incorporation. Total yield of the copolymer with about 9% MMA incorporation, according to the chromatography result, was 3.3 g. Results are shown in Table 1. The a-PS and copolymer in the mixture were separated by silica gel column chromatography. TLC was used to determine the best solvent mixture as elutant. A 5:13 mixture of THF:pentane was found to be the best solvent for the separation of the a-PS/copolymer mixture. A 5 cm×20 cm silica gel column was used for chromatography, with 0.3 g of the polymer mixture eluted by a solvent mixture of 100 mL of THF and 260 mL pentane. The column was finally eluted with 90 mL THF. All elutants were collected in tubes (about 25 mL in each of 19 test tubes). Polymer was detected in the third, fourth, 16$^{th}$, 17$^{th}$, and 18$^{th}$ test tubes. Removal of solvent from test tubes No. 8–10 afforded no polymer. $^1$H NMR analysis indicated that test tubes No. 3–4 contained copolymer and test tubes No.16–18 contained amorphous polystyrene homopolymer. Colorless polymeric material was obtained by removal of solvent and then triturated in 4 mL MeOH by vigorously stirring for 24 h. The solid polymer was collected by filtration, washed with 3×4 mL of MeOH, and dried at 120° C. under vacuum for 24 h. 0.2 g copolymer was obtained. The yield after extraction (containing both a-PS and copolymer) was 5.0 g.

EXAMPLE 5

Copolymerization of Styrene with MMA Catalyzed by an In Situ Generated Ti(III) Species with Zn Assisted Reduction Dry 20:1 styrene/MMA mixture 20 mL (188 mmol) was vacuum transferred into a 50 mL flame-dried, oxygen/moisture-free flask having a side outlet fitted with a rubber septum and equipped with a magnetic stirrer. The flask was placed in a 60° C. water bath. A 2 mL Wilmad screw-capped vial and an air-tight syringe were brought into the glovebox. Next, 8.0 mg (34 µmol) of Cp*TiMe$_3$, 30.0 mg (32.5 µmol) of $(C_6H_5)_3C^+B(C_6F_5)_4^-$, and about 1 mL of toluene were charged in the vial, followed by vigorous shaking for 2 min to allow the reagents to react. Then 25 mg (385 µmol) of Zn powder were added to the solution and the mixture aged for 1.5 h. Over this time period, the solution color changed from orange to dark brownish-green. The solution was removed from the glovebox and the supernatant injected into the stirring MMA/styrene mixture by syringe. The solution became viscous after 15 min. After vigorous stirring for 60 min, the reaction was quenched by addition of 20 mL of MeOH. After filtration, the polymer was extracted with a 1:3 toluene/MeOH mixture. This was carried out by dissolving the polymer in 150 mL toluene and then adding 350 mL MeOH. The filtrate from the first extraction contained 4 g (not dry) copolymer with about 35% MMA incorporation. The MMA incorporation ratio decreased with increasing numbers of extractions. The extraction was repeated three times. The final product was found to be a mixture of a-PS and copolymer with about 10% MMA incorporation. The yield after extraction was 5.5 g. Total yield of the copolymer with about 10% MMA incorporation, according to the chromatography result, was 3.7 g. Results are shown in Table 1.

EXAMPLES 6–8

Further polymerizations of styrene and MMA were performed using techniques similar to those described for Example 3. The results are shown in Table 2.

EXAMPLES 9–11

Further polymerizations of styrene and MMA were performed using techniques similar to those described for Examples 4–5. In Examples 9–11, a dry 19:1 styrene/MMA mixture (10.0 mL; 94 mmol) was used, and the catalyst was prepared using 7.0 mg (31 µmol) of Cp*TiMe$_3$, 26 mg (29 µmol) of Ph$_3$C$^+$B(C$_6$F$_5$)$_4^-$, 15 mg (225 µmol) Zn in 50 mL of toluene and 2 hours reduction time. The results are shown in Table 2.

Comparative Runs B–E

A series of Comparative Runs were performed to confirm that the identity of the titanium-containing catalytic species. Four attempted polymerizations were conducted combinations of zinc power, dimethyl zinc, and tritylperfluorophenyl borate as catalyst materials using polymerization techniques described in Example 1. Results are presented in Table 3 and indicate the polymerization catalytic species observed in the Examples is the Ti-containing species and not Zn or a borate.

TABLE 1

| | Ex. 1 | Ex. 2 | Run A | Ex. 3 | Ex. 4 | Ex. 5 |
|---|---|---|---|---|---|---|
| S:M[1] (mol:mol) | 1:0 | 0:1 | 1:1 | 1:1 | 20:1 | 20:1 |
| Feed Vol. (mL) | 2.0 | 2.0 | 10.0 | 10.0 | 10.0 | 20.0 |
| Temp. (° C.) | 21 | 21 | 21 | 21 | 21 | 60 |
| Time (min.) | 15 | 5 | 1440 | 180 | 60 | 60[9] |
| Y1[2] (grams) | 1.2 | 1.4 | 0.8 | 6.0 | 8.0 | 18 |
| Y1 MMA Content[3] (% MMA) | — | — | 10 | — | — | — |
| Y2[4] (grams) | — | — | — | 5.0 | 5.0 | 5.5 |
| Y2 MMA Content[5] (% MMA) | — | — | — | 15 | 10 | 10 |
| Y3[6] (grams) | — | — | — | — | 3.3 | 3.7 |
| Y3 MMA Content[7] (% MMA) | — | — | — | — | 9 | 10 |
| Tacticity (S/M)[8] | s (>95%) | s(80% rr) | s/(co-iso + s) | s/(co-iso + s) | a-PS/co-iso | a-PS/co-iso |
| Mw (×10⁻³) | 170 | 190 | — | 24.2 | 24.0 | 15.0 |
| Mw/Mn | 2.1 | 2.2 | — | 3.2 | 6.4 | 5.6 |

[1]S:M = Styrene:MMA ratio;
[2]Yield after methanol precipitation from toluene polymer solution;
[3]MMA content (mol. %) in the Y1 product;
[4]Yield of product three times extracted with toluene/MeOH;
[5]MMA content (mol. %) in the Y2 product;
[6]Yield of chromatographically separated product;
[7]MMA content (mol. %) in the Y3 product;
[8]Tacticity determined by $^{13}$C NMR by measuring rr, rm and mm triads; s = syndiotactic (rr triads); co-iso = isotactic copolymer; a-PS = atactic polystyrene;
[9]Reaction probably completed in less time than stated, since product became viscous after 15 min.

TABLE 2

| | Ex. 6 | Ex. 7 | Ex. 8 | Ex. 9 | Ex. 10 | Ex. 11 |
|---|---|---|---|---|---|---|
| S:M[1] (mol:mol) | 9:1 | 9:1 | 9:1 | 19:1 | 19:1 | 19:1 |
| Feed Vol. (mL) | 10.0 | 10.0 | 10.0 | 20.0 | 20.0 | 20.0 |
| Temp. (° C.) | 21 | 21 | 21 | 0 | 21 | 50 |
| Time (min.) | 10 | 20 | 30 | 720 | 720 | 720 |
| Y1[2] (grams) | 3.0 | 3.2 | 3.0 | 8.9 | 12.7 | 12.0 |
| Y1 MMA Content[3] (% MMA) | 10 | 9 | 10 | — | — | — |
| Y2[4] (grams) | — | — | — | 8.0 | 11.5 | 11.0 |
| Y2 MMA Content[5] (% MMA) | — | — | — | 2.2 | 4.0 | 0.4 |
| Y3[6] (grams) | — | — | — | 0.4 | 1.1 | 0.6 |
| Y3 MMA Content[7] (% MMA) | — | — | — | 7.0 | 10 | 6.0 |
| Tacticity (S/M)[8] | s/co-iso | s/co-iso | s/co-iso | co-iso | co-iso | co-iso |

TABLE 2-continued

| | Example (Run) | | | | | |
|---|---|---|---|---|---|---|
| | Ex. 6 | Ex. 7 | Ex. 8 | Ex. 9 | Ex. 10 | Ex. 11 |
| Mw (×10⁻³) | 31.3 | 33.1 | 92.5 | — | 1.3[9] | 1.5[9] |
| Mw/Mn | 3.2 | 2.3 | 3.1 | — | 1.5[9] | 1.7[9] |

[1]S:M = Styrene:MMA ratio;
[2]Yield after methanol precipitation from toluene polymer solution;
[3]MMA content (mol. %) in the Y1 product;
[4]Yield of product three times unextracted with toluene/MeOH;
[5]MMA content (mol. %) in the Y2 product;
[6]Yield of chromatographically separated product;
[7]MMA content (mol. %) in the Y3 product;
[8]Tacticity determined by $^{13}$C NMR by measuring rr, rm and mm triads; s = syndiotactic (rr triads); co-iso = isotactic copolymer (mm triads);
[9]Based on chromatographically separated portion.

TABLE 3

| Run | B | C | D | E |
|---|---|---|---|---|
| Catalyst | Ph₃C⁺B(C₆F₅)₄⁻Zn | Me₂Zn | Ph₃C⁺B(C₆F₅)₄⁻Me₂Zn | Ph₃C⁺B(C₆F₅)₄⁻Me₂Zn |
| Amount of Catalysts (μmol) | 41 / 122 | 200 | 28 / 200 | 28 / 200 |
| Monomers Amounts (mL) | MMA (0.4) | Styrene (19) MMA (1) | Styrene (19) MMA (1) | MMA (2) |
| Temp. ° C. | 21 | 21 | 21 | 21 |
| Time (hours) | 72 | 12 | 12 | 12 |
| Results | No Reaction | Formed 0.41 g of amorphous polystyrene | Formed 1.1 g of copolymer containing 2.5% MMA | No Reaction |

What is claimed is:

1. A method of polymerizing olefins comprising contacting one or more olefin monomers under polymerization conditions with a catalyst formed by in situ reduction of a catalyst precursor comprising {Cp*MRR'$_n$}⁺{A}⁻ wherein CP* is a cyclopentadienyl or substituted cyclopentadienyl moiety; M is an early transition metal; R is a C₁–C₂₀ hydrocarbyl; R' is independently selected from hydride and C₁–C₂₀ hydrocarbyl; n is an integer selected to balance the oxidation state of M; and A is a suitable non-coordinating anionic cocatalyst,
with a reducing agent.

2. A method of polymerizing olefins comprising contacting one or more olefin monomers under polymerization conditions with a catalyst formed by in situ reduction of a catalyst precursor comprising {Cp*MRR'$_n$}⁺{A}⁻ wherein Cp* is a cyclopentadienyl or substituted cyclopentadienyl moiety; M is a Group 4 transition metal; R is a C₁–C₂₀ hydrocarbyl; R' is independently selected from hydride, C₁–C₂₀ hydrocarbyl n is 0 or 1 selected to balance the oxidation state of M; and A is a suitable non-coordinating anionic cocatalyst,
with a metallic reducing agent.

3. The method of claim 1 using a catalyst system in which the transition metal is a Group 4 transition metal.

4. The method of claim 1 using a catalyst system in which the transition metal is titanium and the Cp* is cyclopentadienyl.

5. The method of claim 1 using a catalyst system in which R and R' are C₁–C₂₀ alkyl, aryl, alkylaryl or arylalkyl groups.

6. The method of claim 1 using a catalyst system in which the reducing agent is a metal or metal alloy.

7. The method of claim 1 using a catalyst system in which the reducing agent is zinc.

8. The method of claim 1 using a catalyst system in which A is a perfluroaryl borate.

9. The method of claim 1 using a catalyst system in which A is derived from a borane cocatalyst precursor.

10. The method of claim 1 using a catalyst system in which the cocatalyst precursor is tris(pentafluorophenyl)borane; tris (2,2',2"-nonafluorbiphenyl)borane; or tris(β-perfluoronaphthyl)borane.

11. The method of claim 1 using a catalyst system in which the cocatalyst precursor is tris (2,2',2"-nonafluorbiphenyl)borane.

12. The method of claim 2 using a catalyst system in which M is Ti$^{IV}$ and n=1.

13. The method of claim 12 using a catalyst system in which R and R' are C₁–C₄ alkyl groups and in which Cp* is cyclopentadienyl.

14. The method of claim 13 using a catalyst system in which R and R' are methyl groups.

15. The method of claim 13 in which a polymerized monomer comprises C₂ to C₂₀ polar monomers containing an olefinic group.

16. The method of claim 13 using a catalyst system in which the cocatalyst precursor is tris(pentafluorophenyl)borane; tris (2,2',2"-nonafluorbiphenyl)borane; or tris(β-perfluoronaphthyl)borane.

17. The method of claim 15 in which a polar monomer comprises unsaturated acids and their derivatives, vinyl esters, vinyl amides, vinyl amines, and acrylonitrile.

18. The method of claim 13 in which a polymerized monomer comprises C₂ to C₂₀ nonpolar monomer containing an olefinic group.

19. The method of claim 18 in which a polymerized olefin monomer comprises styrene.

20. The method of claim 17 in which a polymerized olefin monomer comprises methyl methacrylate.

* * * * *